(12) United States Patent
Verhaegen (10) Patent No.: US 7,594,757 B2
(45) Date of Patent: Sep. 29, 2009

(54) MACHINE WITH AN IMPROVED BEARING LUBRICATION

(75) Inventor: Ken Gustaaf Helena Verhaegen, Aartselaar (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 249 days.

(21) Appl. No.: 10/590,274

(22) PCT Filed: Feb. 17, 2005

(86) PCT No.: PCT/BE2005/000023

§ 371 (c)(1),
(2), (4) Date: Aug. 22, 2006

(87) PCT Pub. No.: WO2005/080814

PCT Pub. Date: Sep. 1, 2005

(65) Prior Publication Data

US 2007/0177835 A1     Aug. 2, 2007

(30) Foreign Application Priority Data

Feb. 23, 2004   (BE) .................... 2004/0101

(51) Int. Cl.
*F16C 37/00*   (2006.01)
*F16C 33/66*   (2006.01)
*F16N 39/02*   (2006.01)

(52) U.S. Cl. .................. 384/467; 384/311; 384/313; 184/104.3

(58) Field of Classification Search ......... 384/466–468, 384/473–476, 518, 551, 606; 184/7.2, 8, 184/39.1, 55.1, 104.1–104.3, 6.1; 494/46, 494/83
See application file for complete search history.

(56) References Cited

U.S. PATENT DOCUMENTS

| 2,770,891 | A |   | 11/1956 | Wendel |
| 2,975,865 | A | * | 3/1961  | Rumpel ..................... 184/7.2 |
| 3,223,465 | A | * | 12/1965 | Ono ........................... 384/466 |
| 3,276,827 | A | * | 10/1966 | Diver et al. ................ 384/467 |

(Continued)

FOREIGN PATENT DOCUMENTS

DE         87 05 477       8/1988

(Continued)

OTHER PUBLICATIONS

Patent Abstracts of Japan, vol. 009, No. 014 (M-352), Jan. 22, 1985 & JP 59 161201 A (Okuma Tekkosho KK), Sep. 12, 1984 abstract.

(Continued)

*Primary Examiner*—Marcus Charles
(74) *Attorney, Agent, or Firm*—Bacon & Thomas, PLLC (57) ABSTRACT

Machine with bearing lubrication, including a housing (2) and a rotor (5) which is provided on a shaft (6), provided in a rotatable manner in the above-mentioned housing (2) by way of oil-lubricated bearings (7). Inside the housing (2), lubrication ducts (14) to supply and discharge oil to and from the bearings (7), and cooling channels (21, 15) to supply and discharge a cooling agent, are provided. The cooling channels (21, 15) open opposite to the shaft (6), in a place between the rotor (5) and a bearing (7).

14 Claims, 5 Drawing Sheets

U.S. PATENT DOCUMENTS

| | | | |
|---|---|---|---|
| 3,555,962 A * | 1/1971 | Wolf et al. | 184/104.1 |
| 3,602,747 A * | 8/1971 | Stroppa et al. | 310/114 |
| 3,870,907 A * | 3/1975 | Hoffman | 310/64 |
| 4,137,997 A * | 2/1979 | Ando | 184/6.22 |
| 4,654,023 A * | 3/1987 | Foldhazy | 494/41 |
| 4,759,427 A * | 7/1988 | Onose et al. | 384/466 |
| 5,927,863 A * | 7/1999 | De Bock | 384/468 |
| 6,228,016 B1 * | 5/2001 | Kristensen et al. | 384/467 |
| 6,579,078 B2 | 6/2003 | Hill et al. | |
| 7,000,734 B2 * | 2/2006 | Nawamoto et al. | 384/466 |

FOREIGN PATENT DOCUMENTS

| | | | |
|---|---|---|---|
| EP | 280660 A2 * | 8/1988 | |
| EP | 0 289 610 | 11/1988 | |
| FR | 2 168 145 | 8/1973 | |
| GB | 595346 | 12/1947 | |
| JP | 54131108 A * | 10/1979 | |
| JP | 10175102 A * | 6/1998 | |
| JP | 2000055063 A * | 2/2000 | |

OTHER PUBLICATIONS

Patent Abstracts of Japan, vol. 2000, No. 13, Feb. 5, 2001 & JP 2000 291674 A (Isuzu Motors LTD), Oct. 20, 2000 abstract.

* cited by examiner

MACHINE WITH AN IMPROVED BEARING LUBRICATION

BACKGROUND OF THE INVENTION

A. Field

The present invention concerns a machine with an improved bearing lubrication.

B. Related Art

More particularly, the invention concerns a machine with an improved bearing lubrication, which machine mainly consists of a housing and a rotor which is provided on a shaft, provided in a rotatable manner in the above-mentioned housing by means of oil-lubricated bearings.

Several methods for lubricating such bearings are already known, such as an oil bath lubrication, an oil circulation system, an oil injection lubrication, the oil drop method, an oil mist lubrication and what is called the oil minimum lubrication.

Depending on the application, a specific lubrication method is selected, whereby it is always important to find a balance between sufficient oil being available on the one hand to build up a lubricating film which guarantees that there is no contact between the rolling elements and the bearing rings, and not more oil being admitted than is strictly necessary in order to avoid additional bearing losses on the other hand, which in turn also produce a rise in the bearing temperature.

A problem which occurs, for example in case of screw compressors, is that, due to the heat development of the compression, the rotor is heated, and that this heat of the rotor concerned, is dissipated via the rotor shaft and the bearings of this rotor shaft to the environment, as a result of which the bearings are heated.

Such a phenomenon also occurs with electric motors and generators, whereby the bearings are heated by heat losses via the rotor shaft.

Such a heating of the bearings leads to premature wear, more particularly of the roller elements and of the bearing rings of the bearings, as the warming up has a negative influence on the viscosity of the lubricating oil, and this viscosity may be insufficient to build up the lubricating film in a sufficient manner.

In order to avoid this problem, an excessive amount of oil is at present being directed to the bearing, whereby this oil serves as cooling liquid for the bearing, as a result of which the temperature of the bearing can be maintained within the required limits.

The excessive use of oil is disadvantageous however, in that there are additional, unwanted bearing losses, as the oil which is present in the bearing is turned over, and which bearing losses become in particular apparent at high rotational speeds, leading to a lower efficiency of the bearing as such, and consequently of the machine as a whole.

Especially in the case of high-speed motors, which are very compact, the phenomenon occurs, as the heat resulting from the mechanical and electric losses in the motor shaft can only be dissipated via a limited surface.

Another disadvantage of the bearings being warmed up, is that the bearing cage must usually be made of a special material which resists high temperatures, which is expensive.

When ball bearings with an angular contact are used, the problem of the bearing losses is further increased as a result of the pumping operation of this type of bearing.

GB 595.346 describes a machine in the form of a turbine or a compressor, which is provided with a bearing which is lubricated by means of an oil mist. Further GB 595.346 describes the presence of a separate cooling circuit which uses air or gas to cool the shaft of the machine.

A disadvantage of such known machines is that they are complex and require completely separate circuits for cooling the shaft and lubricating the bearing. Also, the air or gas cooling will be insufficient for cooling the shaft and for realizing a proper functioning and a long life of the machine.

From U.S. Pat. No. 6,579,078 is known a centrifugal compressor which is driven by a high-speed motor and which is bearing-mounted in a housing, whereby the lubricating oil of the slide bearings also serves to cool the bearings.

The basic idea of U.S. Pat. No. 6,579,078 is to direct cooled oil through the slide bearings in order to cool and lubricate the bearings and to moreover use the excessive oil going through the bearing to flow onto the shaft and to thus cool the latter.

The excessive lubrication of the bearings leads to additional turbulence losses, and the cooling oil is moreover heated in this bearing, as a result of which the shaft, which is irrigated by the oil, will be cooled less efficiently.

However, these additional cooling methods are not efficient and require additional measures, in this case in the form of compressed air injection, in order to avoid that oil ends up in the space between the rotor and the stator. The present invention aims to remedy one or several of the above-mentioned and other disadvantages.

BRIEF SUMMARY OF THE INVENTION

To this end, the invention concerns a machine with an improved bearing lubrication, which machine mainly consists of a housing and of a rotor provided on a shaft which is provided in the above-mentioned housing in a rotatable manner by means of oil-lubricated, bearings, whereby lubrication ducts are provided in the housing to supply and discharge oil to and from the bearings, and whereby it is provided with cooling channels to supply and discharge a cooling agent, which cooling channels open opposite to the shaft, in a place between the rotor and the above-mentioned bearing and whereby the above-mentioned cooling channels are connected to the above-mentioned lubrication ducts.

An advantage of the invention is that no excessive amount of oil must be sent to the bearings in order to cool the bearings, as a result of which this amount of oil can be optimized for sufficient lubricating film to be built up, such that the bearing losses are strongly reduced.

Another advantage is that, thanks to the direct injection of a cooling agent on the shaft, the heat flow of the rotor to the bearing is interrupted, as a result of which a reduced heat flow flows to the bearing and as a result of which also the life of the bearing is extended, since the viscosity of the oil is not affected by the temperature of the bearing.

An additional advantage of the lower temperature of the bearing is that a standard bearing cage can be used for the bearings, as a result of which the cost price of the bearings can be lowered.

Still another advantage of such a machine according to the invention is that the lubricating oil also serves as a cooling agent for the shaft, which allows to make the construction of the machine compact, relatively cheap and simple as it does not require the presence of separate circuits.

According to a preferred characteristic of the invention, the rotor shaft is provided, opposite to the cooling channels, with one or several grooves.

This offers the major advantage that the contact surface between the cooling agent and the shaft increases, which considerably improves the cooling of the shaft.

In a preferred embodiment, the above-mentioned cooling channels extend through a gasket, which is provided with sealing lips directed towards the shaft on both sides of the above-mentioned grooves.

An advantage thereof is that no additional measures must be taken to prevent oil from entering between the rotor and the stator.

In the most preferred embodiment, a thermal barrier is also provided between the place where the cooling liquid is injected on the above-mentioned shaft and the bearing, whereby this thermal barrier consists of a material layer which is a bad heat conductor.

In this manner, the heat flow from the shaft to the bearings is minimized, and the life of the bearings is extended.

If the machine with improved bearing lubrication is an electric motor or generator, the cooling channels extend in the bearing cap which seals the housing, and the winding heads of the electric coils are cased in a heat-conducting material, for example a heat-conducting paste or epoxy or silicone, sprayed around the heads and which makes contact with the above-mentioned bearing cap.

By providing the bearing plate with a cooling, it is also possible to dissipate heat from the winding heads in the axial direction, which is essential for example in case of enclosed permanent magnetic motors.

DESCRIPTION OF THE DRAWINGS

In order to better explain the characteristics of the present invention, the following preferred embodiments of a machine with an improved bearing lubrication according to the invention are described as an example only, with reference to the accompanying drawings, in which:

FIGS. 2 to 5 represent variants of a motor with an improved bearing lubrication, according to FIG. 1.

DETAILED DESCRIPTION OF PREFERRED EMBODIMENT(S)

Figure 1:
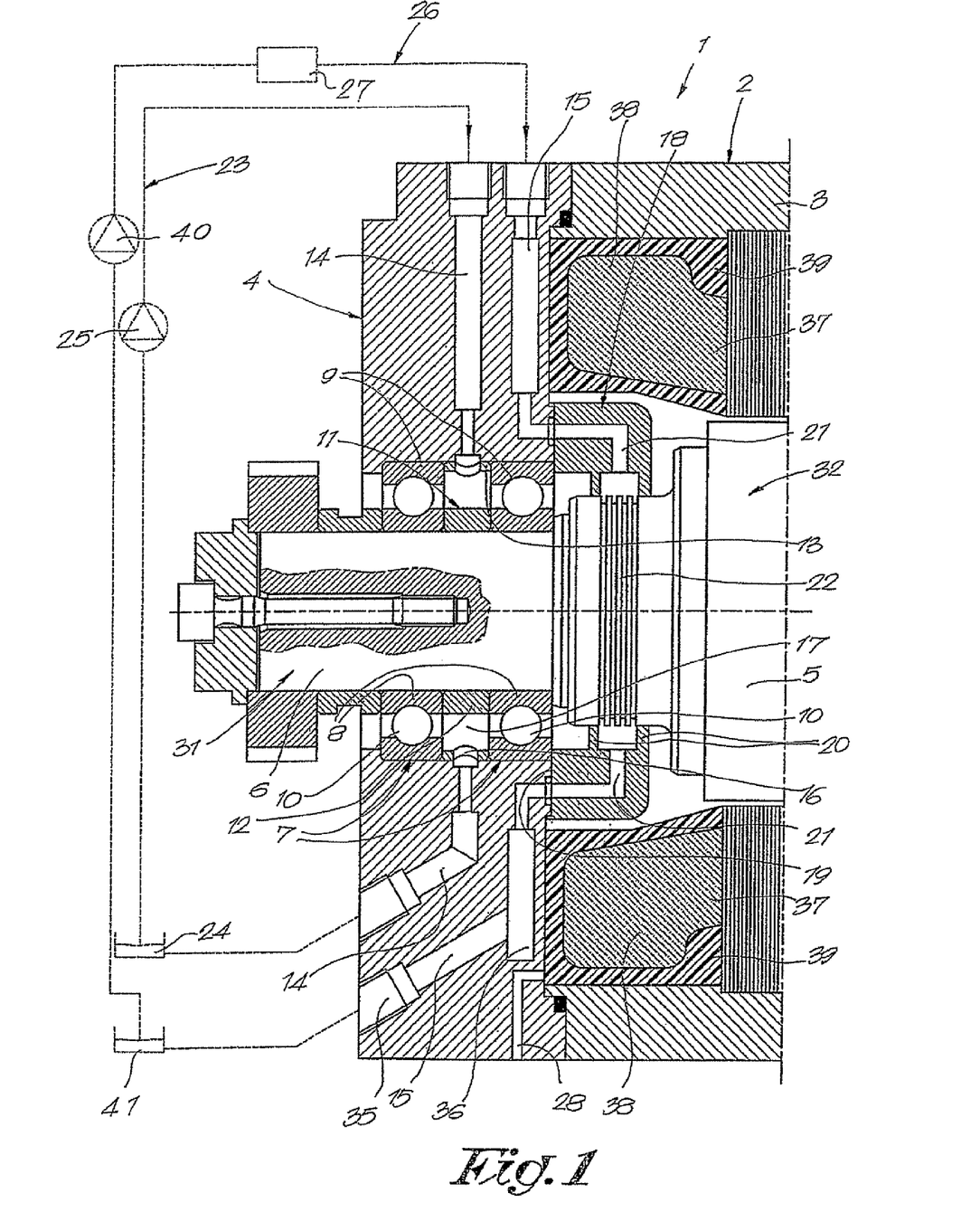
FIG. 1 is a section of a part of a machine in the form of an electric motor, which is provided with an improved bearing lubrication according to the invention.

FIG. 1 represents a part of an electric motor 1, more particularly of an axial end of such a motor 1, which mainly consists of a housing 2 with a jacket 3 which is sealed at the represented far end by means of a bearing cap 4.

In the above-mentioned housing 2 is provided a rotor 5, provided on a shaft 6, which shaft 6 is provided in the above-mentioned housing 2 in a rotating manner by means of bearings 7, which are provided at the represented far end, in the above-mentioned bearing cap 4.

Each of the bearings 7 in this case consists of an inner ring 8 and an outer ring 9, in between which are situated roller elements 10, in this case balls.

Between the bearings 7 is provided a spacer sleeve 11 which consists of two concentric rings 12 and 13, the inner ring 12 of which is provided on the shaft 6 and the outer ring 13 of which is provided in the bearing cap 4.

In the bearing cap 4 are also provided lubrication ducts 14 and separate cooling channels 15, whereby each of the above-mentioned lubrication ducts 14 open via an opening 16 in the above-mentioned outer ring 13 of the spacer sleeve 11 and, opposite to the inner ring 12, in a space 17, which extends axially between the above-mentioned bearings 7 and which extends radially between the above-mentioned concentric rings 12 and 13 of the spacer sleeve 11.

Around the shaft 6 is provided a gasket 18, which is provided with a standing side wall 19 against the above-mentioned bearing cap 4 and which is provided with two sealing lips 20 directed towards the shaft 6, which are connected to the shaft 6 with a very small clearance and which are situated at a distance from each other.

In the above-mentioned gasket 18 are also provided channels 21, which open opposite to the shaft 6, between the above-mentioned sealing lips 20, and in a place between the rotor 5 and the above-mentioned bearings 7.

The above-mentioned cooling channels 15 in the bearing cap 4 are connected onto the channels 21 of the gasket 18 and thus form a single continuous cooling channel 15, 21.

Between the above-mentioned sealing lips 20 are provided grooves 22 in the shaft 6, opposite to the channels 21 of the gasket 18.

The above-mentioned cooling channels 21 are preferably, directed tangentially onto the shaft 6, at their outlet at the shaft 6, according to the rotational direction of the shaft 6.

The above-mentioned lubrication ducts 14 are part of a conventional lubrication circuit 23, which is represented by means of a dashed line in the figure and which is provided with a reservoir 24 with lubricating oil and a hydraulic pump 25.

The above-mentioned cooling channels 15, 21 are in this case part of a cooling circuit 26 which also comprises, apart from a hydraulic pump 40 and a reservoir 41, a cooling device 27.

In the bearing cap 4 is provided a channel 28 at the bottom, which is connected to the inner space of the housing 2.

The working of such a motor 1 with an improved bearing lubrication is very simple and as follows.

When the motor 1 is excited, the rotor 5 is being driven and the bearings 7 of the rotor shaft 6 are lubricated by means of the lubrication circuit 23, whereby the pump 25 draws in lubricating oil from the reservoir 24 and directs this via the lubrication ducts 14 and the space 17 between the bearings 7, towards the bearings 7.

The lubricating oil delivery can hereby be adjusted with great precision, such that a lubricating film is built up to a desired degree.

When the pump 40 in the cooling circuit 26 is switched on, cooling oil is in this case drawn in from a reservoir 41 and injected via a cooling device 27 and the first cooling channel 15, 21 onto the shaft 6, between the sealing lips 20.

The cooling oil is preferably injected according to the sense of rotation of the shaft 6.

The grooves 22 which are provided opposite to the cooling channels 21, 15 in the shaft 6 make sure that the heat-exchanging surface between the shaft 6 and the cooling oil is enlarged, and that the heat transfer from the shaft 6 to the cooling oil is thus promoted.

Next, the heated cooling oil is carried back to the reservoir 24 via a second cooling channel 21, 15.

Thanks to the small clearance between the shaft 6 and the sealing lips 20, only a very small amount of cooling oil will leak away to the inner space of the housing 2. The limited amount of cooling oil which leaks away to this space is discharged via the channel 28 in the bearing cap 4.

Since the lubricating oil only serves to lubricate and not to cool the bearings 7, the delivery of the lubricating oil can be restricted, such that the bearing losses are strongly reduced and the temperature in the bearings 7 is restricted, as a result of which also the life of the bearings 7 is extended.

It is also possible to use another cooling agent than cooling oil to cool the shaft 6, such as for example water or a cooling gas.

Figure 2:
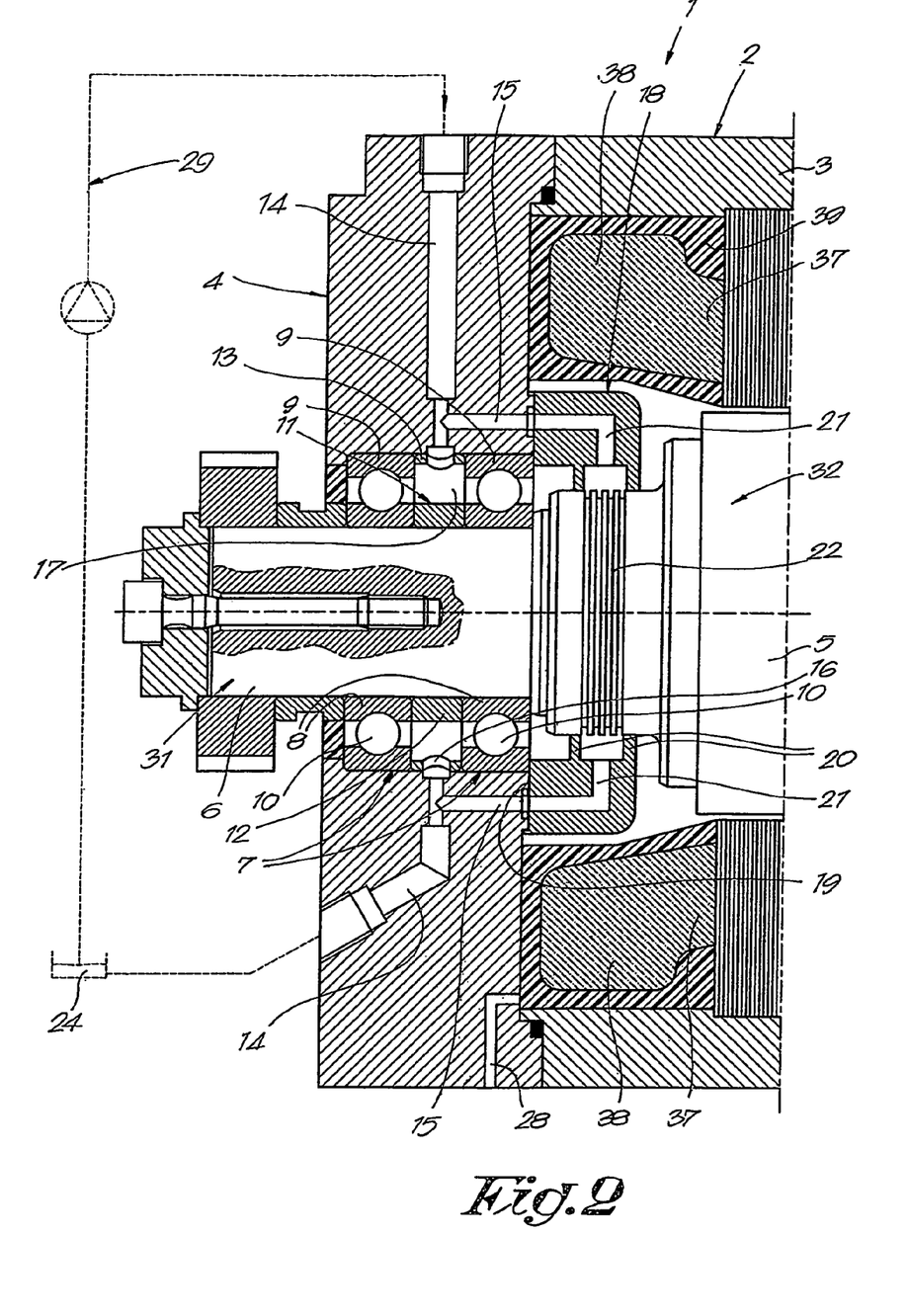

FIG. 2 represents a variant of a motor 1 with an improved bearing lubrication according to the present invention, whereby the cooling channels 15 in the bearing cap 4 are connected to the lubrication ducts 14.

Hereby is provided only one hydraulic circuit 29, through which oil is carried. Further, the working is analogous to the preceding embodiment.

FIG. 3 represents a variant of FIG. 2, whereby in this case the shaft 6, between the cooled part of the shaft 6 and the bearings 7, is provided with a thermal bridge 30, whereby the shaft 6 is made of several parts, namely of bearing-mounted parts 31 and non-bearing-mounted parts 32, whereby the thermal bridge 30 is formed of a ring 33 made of a thermally insulating material, for example a ceramic material, which is provided between the above-mentioned bearing-mounted and non-bearing-mounted parts 31 and 32.

The ring 33 made of thermally insulating material makes sure that the heat flow from the rotor 5 via the shaft 6 towards the bearings 7 is stopped, either or not partly, such that the temperature in the bearings 7 is restricted and the oil delivery through the bearings 7 can thus be reduced and bearing losses are prevented.

Figure 4:
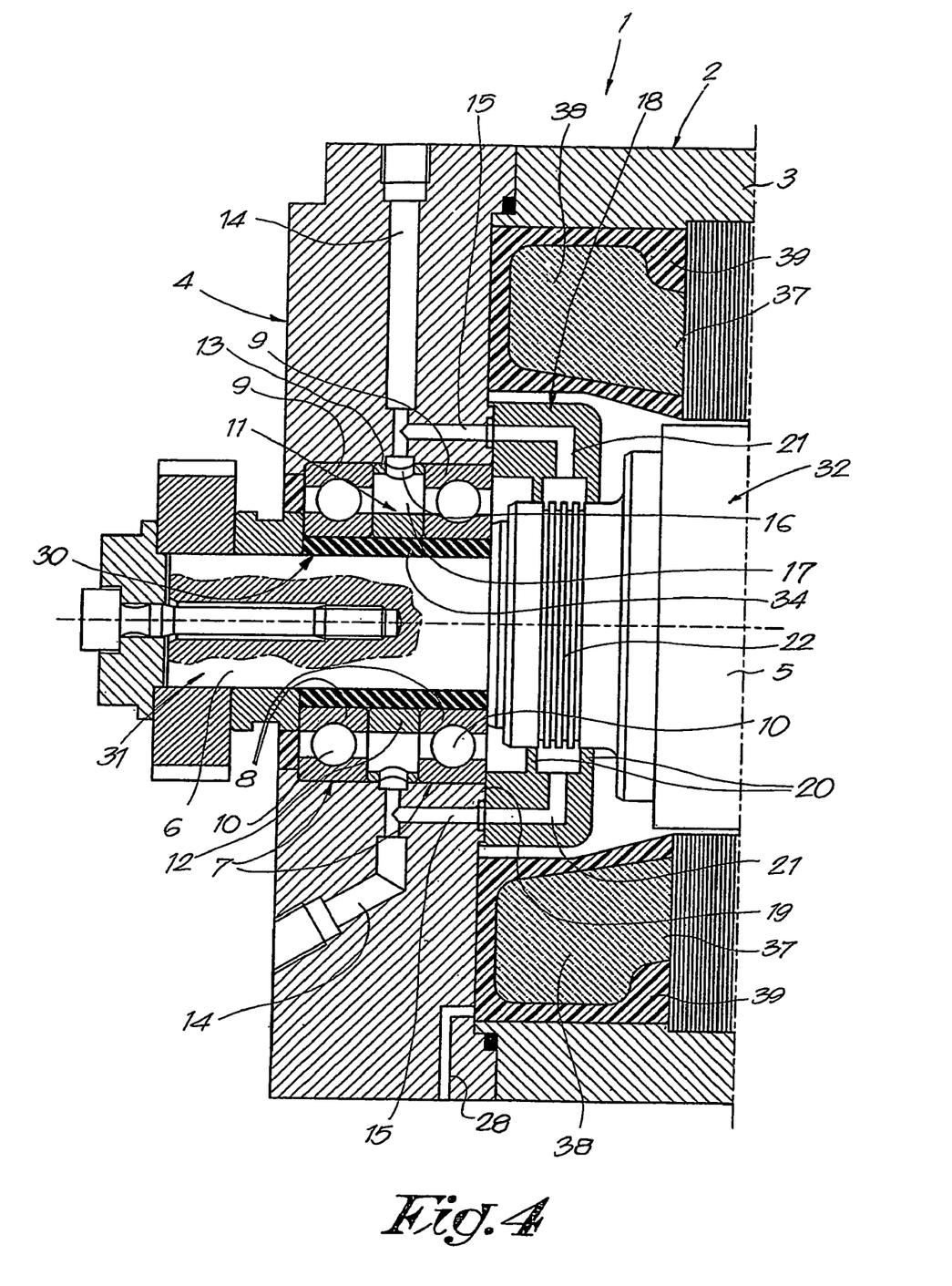

FIG. 4 represents a variant of the embodiment according to FIG. 3, whereby, in this case, the thermal bridge 30 is formed of a bush 34 made of a thermally insulating material which is provided between the shaft 6 and the bearing 7.

In this case as well, the heat flow from the shaft 6 to the bearings 7 is restricted thanks to the presence of the insulating bush 34.

Figure 5:
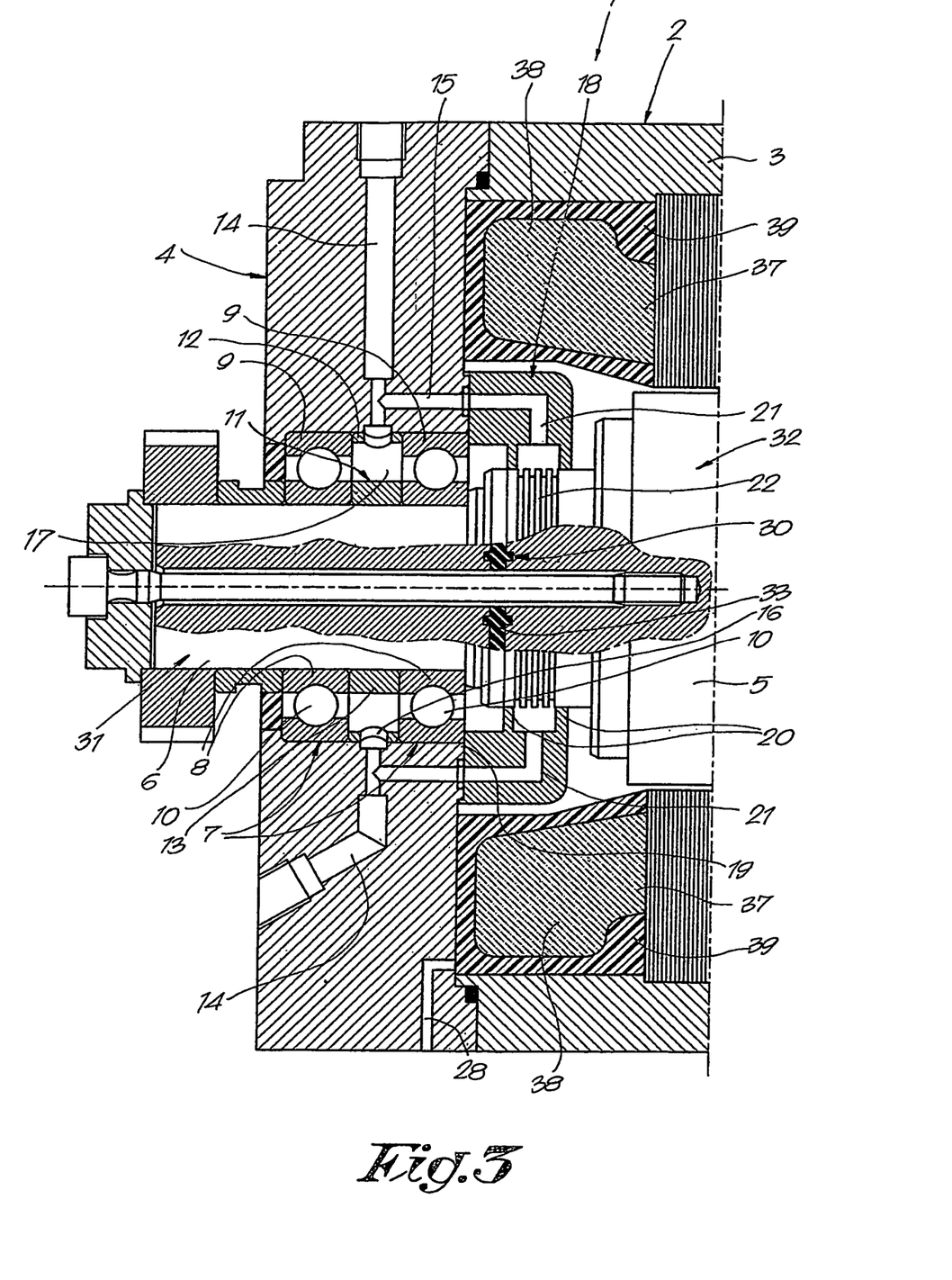

FIG. 5 represents another embodiment of a motor 1 with an improved bearing lubrication according to the invention.

In this embodiment, compared to FIG. 2, two additional cooling channels 35 are provided in the bearing cap 4, which are connected to a ring-shaped cooling space 36 in the above-mentioned bearing cap 4. These additional cooling channels 35 of the bearing cap 4 may for example also be connected to the lubrication ducts 14 and the cooling channels 15.

In the given example, the motor 1 is an electric motor with electric coils 37, whose winding heads 38 are surrounded by a heat-conducting and electrically insulating material 39 at the far ends, for example a heat-conducting paste, which has been sprayed around the above-mentioned winding heads 38 in order to fill up the space between the winding heads 38 and the housing 2, whereby this material in particular makes contact with the bearing cap 4.

The heat of the electric coils 37 is, in this case, transmitted to the housing 2 via the winding heads 38 and the heat-conducting material 39.

Through the additional cooling channels 35 and through the enclosed ring-shaped cooling space 36 is directed a cooling fluid, which provides for a cooling of the housing 2, especially of the bearing cap 4 and in particular of the winding heads 38.

The cooling agent which is directed through the additional cooling channels 35 provides for the axial heat dissipation from the bearing cap 4 and in particular from the winding heads 38, whereby this heat dissipation is or may be complementary to the conventional radial jacket cooling of the motor or generator.

The additional cooling channels 35 also make sure that the heat from the bearings 7, flowing via thermal conduction to the bearing cap 4, is dissipated by means of the cooling agent in the additional cooling channels 35, as a result of which the direct cooling of the bearings 7 by means of the lubricating oil can be excluded and, consequently, the bearing losses are reduced.

It is clear that, as a cooling fluid which is directed through the additional cooling channels 35, use can be made of a cooling oil, water or any other suitable cooling liquids, but that also a gas can be used to cool the bearing caps 4.

Naturally, it is not excluded to apply a combination of the above-mentioned characteristics in order to obtain an optimal cooling of the bearings 7, and to be able to restrict the delivery of lubricating oil through the bearings 7 to the very minimum which is required to build up lubricating film in a sufficient manner.

Moreover, the present invention cannot only be applied to electric motors 1, but it can also be applied to any other machine whatsoever which is provided with, one or several oil-lubricated bearings 7, such as for example generators and compressors.

The present invention is by no means limited to the embodiments given as an example and represented in the accompanying drawings; on the contrary, such a machine with an improved bearing lubrication according to the invention can be made in all sorts of shapes and dimensions while still remaining within the scope of the invention.

The invention claimed is:

1. Machine with bearing lubrication, comprising a housing (2) and a rotor (5) which is provided on a shaft (6), provided in a rotatable manner in the housing (2) by oil-lubricated bearings (7), wherein, inside the housing (2), lubrication ducts (14) are provided to supply and discharge oil to and from the bearings (7), and further wherein cooling channels (21, 15) are provided to supply and discharge a cooling agent, which cooling channels (21, 15) open opposite to the shaft (6), in a place between the rotor (5) and a bearing (7) and wherein the cooling channels (21, 15) are connected to the lubrication ducts (14) in one hydraulic circuit (29).

2. Machine with bearing lubrication according to claim 1, wherein the shaft 6 on the place between the rotor (5) and the bearing (7) is provided with one or several grooves (22) opposite to the cooling channels (21, 15).

3. Machine with bearing lubrication according to claim 2, wherein the cooling channels (21) extend through a gasket (18), provided on both sides of the grooves (22) and having sealing lips (20) directed towards the shaft (6).

4. Machine with bearing lubrication according to claim 3, wherein a clearance between the sealing lips (20) and the shaft (6) is very small.

5. Machine with bearing lubrication according to claim 3, wherein the cooling channels (21, 15) open between the sealing lips (20).

6. Machine with bearing lubrication according to claim 5, wherein the cooling channels (21, 15) are tangentially directed onto the shaft (6) at their outlet at the shaft (6).

7. Machine with bearing lubrication according to claim 6, wherein the cooling channels (21, 15) are oriented such that they inject the cooling agent according to the direction of rotation of the shaft (6).

8. Machine with bearing lubrication according to claim 1, wherein the shaft (6) is provided with a thermal bridge (30) between a cooled part and the bearing.

9. Machine with bearing lubrication according to claim 8, wherein the shaft (6) is made of several parts, including bearing-mounted parts (31) and non-bearing-mounted parts (32), and wherein the thermal bridge (30) is formed of a ring (33) made of a thermally insulating material, which is provided between the bearing-mounted and non-bearing-mounted parts (31 and 32).

10. Machine with bearing lubrication according to claim 8, wherein the thermal bridge (30) is formed of a bush (34) made of a thermally insulating material, which is provided between the shaft (6) and the bearing (7).

11. Machine with bearing lubrication according to claim 1, wherein the lubrication ducts (14) and the cooling channels (15) are provided in a bearing cap (4) comprising part of the housing (2).

12. Machine with bearing lubrication according to claim 11, wherein the bearing cap (4) is provided with cooling channels (35).

13. Machine with bearing lubrication according to claim 12, wherein the lubrication ducts (14), the cooling channels (21, 15) of the shaft (6) and the cooling channels (35) of the bearing cap (4) are connected to each other.

14. Machine with bearing lubrication according to claim 11, wherein the machine is an electric motor (1) or generator, and includes winding heads (38) of electric coils (37) encased in a heat-conducting material (39) which makes contact with the bearing cap (4).

* * * * *

UNITED STATES PATENT AND TRADEMARK OFFICE
CERTIFICATE OF CORRECTION

PATENT NO. : 7,594,757 B2  Page 1 of 1
APPLICATION NO. : 10/590274
DATED : September 29, 2009
INVENTOR(S) : Ken Gustaaf Helena Verhaegen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 287 days.

Signed and Sealed this

Fourteenth Day of December, 2010

David J. Kappos
*Director of the United States Patent and Trademark Office*